US012668147B2

(12) United States Patent
Kuribara et al.

(10) Patent No.: US 12,668,147 B2
(45) Date of Patent: Jun. 30, 2026

(54) ELECTRIC VEHICLE EQUIPPED WITH CHARGING DEVICE THAT CHARGES ON-BOARD STORAGE DEVICE

(71) Applicant: TOYOTA JIDOSHA KABUSHIKI KAISHA, Toyota (JP)

(72) Inventors: Fumiyoshi Kuribara, Toyota (JP); Masanori Koashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 705 days.

(21) Appl. No.: 18/122,902

(22) Filed: Mar. 17, 2023

(65) Prior Publication Data

US 2023/0302941 A1    Sep. 28, 2023

(30) Foreign Application Priority Data

Mar. 23, 2022    (JP) ................................. 2022-046761

(51) Int. Cl.
*H01M 10/46*       (2006.01)
*B60L 50/60*       (2019.01)
*B60L 53/62*       (2019.01)

(52) U.S. Cl.
CPC .............. *B60L 53/62* (2019.02); *B60L 50/60* (2019.02); *B60L 2240/545* (2013.01)

(58) Field of Classification Search
CPC . H02J 7/0042; H02J 7/02; B60L 53/62; B60L 50/60; B60L 2240/545; Y02T 90/12; Y02T 90/14
USPC ........ 320/104, 107, 109, 132, 149, 150, 153
See application file for complete search history.

(56) References Cited

U.S. PATENT DOCUMENTS

| | | | | |
|---|---|---|---|---|
| 10,703,269 | B2 * | 7/2020 | Kusumi | .................... B60Q 9/00 |
| 2012/0326655 | A1 * | 12/2012 | Nomura | .................. B60L 53/14 |
| | | | | 320/107 |
| 2014/0042985 | A1 | 2/2014 | Ishii et al. | |
| 2019/0255996 | A1 * | 8/2019 | Kusumi | .................. B60L 58/12 |
| 2020/0189415 | A1 * | 6/2020 | Ono | ........................ B60L 3/0046 |
| 2020/0207232 | A1 * | 7/2020 | Niwa | ....................... B60L 53/62 |

(Continued)

FOREIGN PATENT DOCUMENTS

| | | |
|---|---|---|
| CN | 110182091 A | 8/2019 |
| EP | 3530518 A1 | 8/2019 |
| JP | 2017093246 A | 5/2017 |

(Continued)

OTHER PUBLICATIONS

Machine translate of WO2011065036A1 (Jun. 3, 2011) (Year: 2011).*

*Primary Examiner* — Edward Tso
(74) *Attorney, Agent, or Firm* — Dinsmore & Shohl LLP

(57)       ABSTRACT

The electric vehicle includes a power storage device, a charger that charges the power storage device using power from an external power supply, and a controller that controls the charger. The controller calculates the required charging time for charging before charging the power storage device by the charger, and calculates the scheduled charging end time using the required charging time; obtains the incomplete factor for which the charging was not completed, in case the charging of the power storage device is not completed at the scheduled charging end time; and obtains the delay factor that delayed the completion of charging, in case the charging of the power storage device is completed beyond the scheduled charging end time.

3 Claims, 3 Drawing Sheets

(56) References Cited

U.S. PATENT DOCUMENTS

2023/0234531 A1* 7/2023 Hioda ................. B60R 21/2346
280/732

FOREIGN PATENT DOCUMENTS

| JP | 2021027687 A | 2/2021 |
| WO | 2011/065036 A1 | 6/2011 |
| WO | 2012/153399 A1 | 11/2012 |
| WO | 2019/034457 A1 | 2/2019 |

* cited by examiner

ELECTRIC VEHICLE EQUIPPED WITH CHARGING DEVICE THAT CHARGES ON-BOARD STORAGE DEVICE

CROSS-REFERENCE TO RELATED APPLICATIONS

The present disclosure claims priority to Japanese Patent Application No. 2022-046761 filed Mar. 23, 2022, which is incorporated herein by reference in its entirety including specification, drawings and claims.

TECHNICAL FIELD

The present disclosure relates to electric vehicles, in particular, to electric vehicles equipped with a charging device that charges an on-board storage device using electric power from an external power supply.

BACKGROUND

Conventional electric vehicles of this type have been proposed to output information to inform the user that external charging has stopped (see, for example, Patent Document 1), when the charging device is controlled to stop charging (external charging) of the power storage device using power from an external power supply without being caused by user actions such as abnormal charging. In this electric vehicle, when the charging device is controlled to stop external charging due to user actions such as unlocking the door locking device, the information to inform the user that external charging has stopped is not output. Thereby, the user is minimally informed of the fact that external charging has stopped, while suppressing the annoyance felt by the user in the notification of the fact that external charging has stopped.

CITATION LIST

Patent Literature

PTL 1: JP2021-27687

SUMMARY

However, in the electric vehicle described above, the user is not notified when the power storage device has successfully finished charging, even though charging takes longer than the scheduled charging time due to a drop in the voltage of the external power supply or other reasons. Therefore, the user may feel uncomfortable about why it takes so long to charge the battery.

The main purpose of the electric vehicle of the present disclosure is to suppress a feeling of discomfort to the user when charging is not completed at the scheduled charging end time or when charging is completed beyond the scheduled charging end time.

The electric vehicle of the present disclosure has adopted the following measures to achieve the main objectives described above.

The electric vehicle of the present disclosure includes a power storage device; a charger configured to charge the power storage device with power from an external power supply; and a controller programmed to control the charger; wherein the controller is programmed to calculate the required charging time for charging before charging the power storage device by the charger, and calculate the scheduled charging end time using the required charging time; obtain the incomplete factor for which the charging was not completed, in case the charging of the power storage device is not completed at the scheduled charging end time; and obtain the delay factor that delayed the completion of charging, in case the charging of the power storage device is completed beyond the scheduled charging end time.

In the electric vehicle of the present disclosure, the controller calculates the required charging time for charging before charging the power storage device by the charger, and calculates the scheduled charging end time using the required charging time. The scheduled charging end time can be calculated, for example, by adding the required charging time to the current time when charging is to start immediately, or by subtracting the sum of the required charging time and the margin time from the completion set time when the user has set a time to complete charging. Then, the controller obtains the incomplete factor for which the charging was not completed, in case the charging of the power storage device is not completed at the scheduled charging end time; and obtains the delay factor that delays the completion of charging, in case the charging of the power storage device is completed beyond the scheduled charging end time. As a result, by informing the user of the acquired incomplete and delay factors, it is possible to suppress the user's feeling of discomfort when charging is not completed at the scheduled charging end time or when charging is completed beyond the scheduled end time.

DETAILED DESCRIPTION OF EMBODIMENTS

Figure 1:
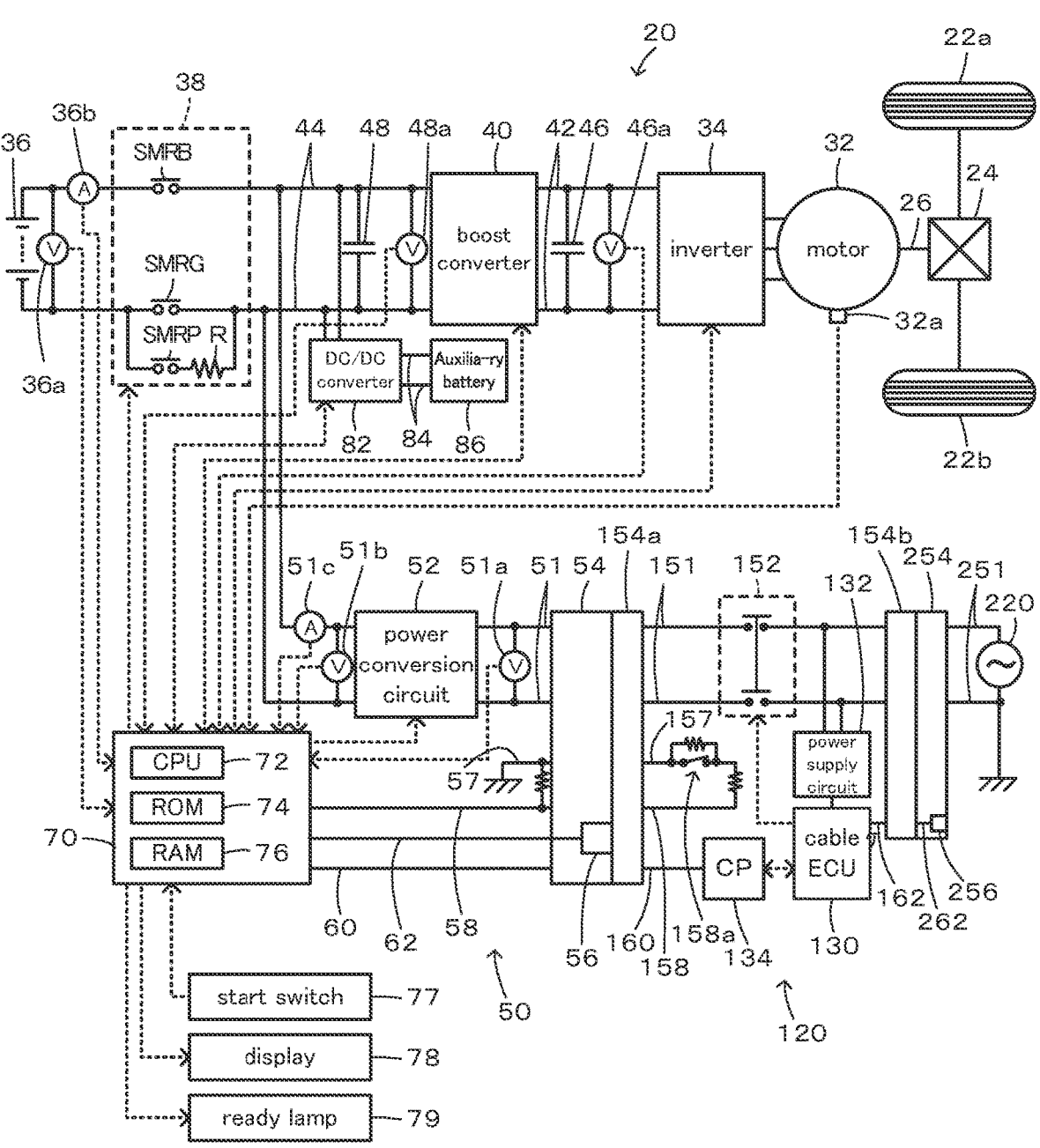
FIG. 1 shows a schematic diagram of the configuration of the electric vehicle 20 of the embodiment of the present disclosure.

The following is a description of the implementation of this disclosure. FIG. 1 shows a schematic diagram of the configuration of the electric vehicle 20 of the embodiment of the present disclosure. As shown in FIG. 1, the electric vehicle 20 of the embodiment includes a motor 32, an inverter 34, a battery 36, boost converter 40, high-voltage side power line 42, low-voltage side power line 44, system main relay 38, charger 50, charging power line 51, vehicle side inlet 54, and an electronic control unit 70. The vehicle side inlet 54 is connected to the commercial power supply 220 connector 254 is connected.

The motor 32 is configured as a synchronous generator motor. The motor 32 has a rotor with embedded permanent magnets and a stator with three-phase coils wound around it. The rotor of the motor 32 is connected to the drive wheels 22a, 22b via differential gears 24 and is connected to a drive shaft 26 connected to the drive wheels 22a, 22b via a differential gear.

The inverter 34 is connected to the motor 32 and to the high voltage side power line 42. The inverter 34 is configured as a well-known inverter circuit having six transistors and six diodes.

The battery 36 is configured, for example, as a lithium-ion rechargeable battery or a nickel-metal hydride rechargeable battery. The battery 36 is connected to the low voltage side power line 44.

The boost converter 40 is connected to the high voltage side power line 42 and the low voltage side power line 44. The boost converter 40 is configured as a well-known boost-boost converter circuit having two transistors, two diodes, and a reactor.

A high voltage side capacitor 46 is connected to the positive and negative bus bars of the high voltage side power line 42. A low voltage side capacitor 48 is attached to the positive and negative bus bars of the low voltage side power line 44. A system main relay 38 is attached to the low voltage side power line 44. The system main relay 38 has a positive pole side relay SMRB, a negative pole side relay SMRG, and a precharge circuit. The positive pole side relay SMRB is attached to the positive bus bar of the low voltage side power line 44. The negative pole side relay SMRG is attached to the negative bus bar of the low voltage side power line 44. The precharge circuit is a circuit consisting of a precharge resistor R and a precharge relay SMRP connected in series, and the negative pole side relay It is installed to bypass the SMRG. The DC/DC converter 82 is connected to the low voltage side power line 44 and is also connected to the auxiliary power line 84 to which the auxiliary battery 86 and auxiliary equipment (not shown) are connected. The DC/DC converter 82 supplies power from the low voltage side power line 44 to the supply to the auxiliary power line 84 with a change in voltage. The DC/DC converter 82 also supplies power from the auxiliary power line 84 to the voltage supply to the low voltage side power line 44 with the change.

Figure 2:
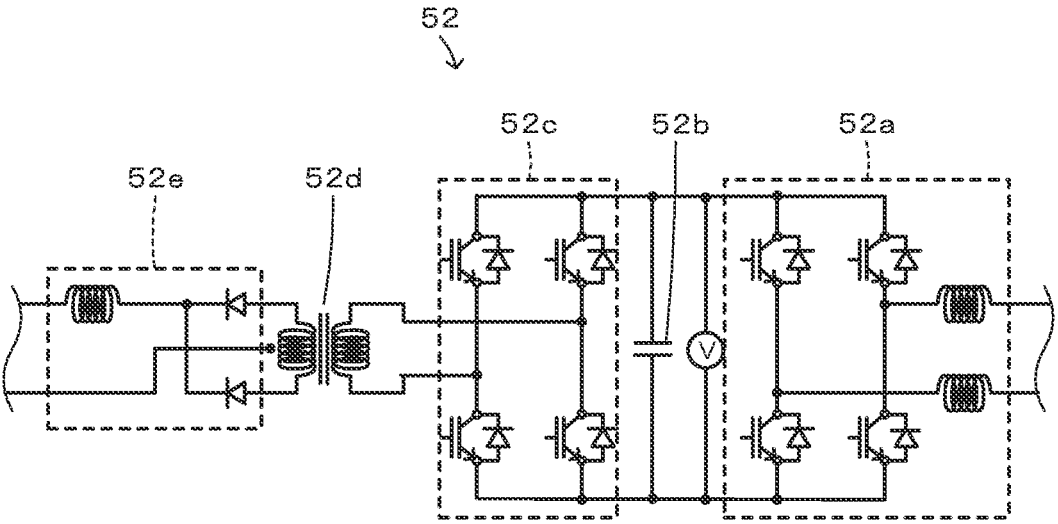
FIG. 2 shows a circuit diagram of an example of a power conversion circuit 52.

The charger 50 has a power conversion circuit 52 attached to the charging power line 51. The charging power line 51 has one end connected between the system main relay 38 and the boost converter 40 in the low voltage side power line 44. The charging power line 51 is connected at the other end to the vehicle side inlet 54. The power conversion circuit 52 is configured as a well-known power conversion circuit that converts AC power from the commercial power supply 220 into DC power of a desired voltage that can charge the battery 36. The power conversion circuit 52, for example, as shown in FIG. 2, includes an AC/DC conversion circuit 52a, a smoothing capacitor 52b, a DC/AC conversion circuit 52c, and an AC/DC conversion circuit 52e. The AC/DC conversion circuit 52a converts AC power supplied from the commercial power supply 220 to DC power of the desired voltage. The DC/AC conversion circuit 52c converts DC power from the AC/DC conversion circuit 52a to AC power. The AC/DC conversion circuit 52e converts AC power transformed by transformer 52d to DC power.

The vehicle side inlet 54 is connected to the charging power line 51 as well as to the vehicle side ground line 57, which is grounded at the other end. The vehicle side inlet 54 is connected to the vehicle side connection line 58 whose other end is connected to the electronic control unit 70. The vehicle side inlet 54 is connected to the vehicle side communication line 60 whose other end is connected to the electronic control unit 70. The vehicle side inlet 54 has a lid sensor 56. The lid sensor 56 is connected to the lid signal line 62 whose other end is connected to the electronic control unit 70. The lid sensor 56 is a sensor that detects whether the lid (lid) covering the vehicle side inlet 54 is open or closed. The vehicle side ground line 57 is connected to the vehicle side connection line 58 via a resistor.

The charger 50 charges the battery 36 using power supply from the commercial power supply 220, when in the state of the vehicle side inlet 54 and the vehicle connector 154a of the charging cable device 120 are connected and the power supply connector 154b of the charging cable device 120 and the power supply side connector 254 are connected.

The charging cable device 120 includes a cable electronic control unit 130, a power supply circuit 132, control pilot circuit 134, a vehicle connector 154a, power supply connector 154b, the cable side power line 151, the charging relay 152, the cable side ground line 157, the cable side connection line 158, the connection switch 158a, and the cable side temperature sensing line 162. The charging relay 152 is attached to the cable side power line 151.

The vehicle connector 154a of the charging cable device 120 is connected to the vehicle side inlet 54 and the power supply connector 154b of the charging cable device 120 is connected to the power supply side connector 254 of the commercial power supply 220. The charging power line 51 is then connected to the power supply side power line 251 of the commercial power supply 220 through the cable side power line 151. The vehicle side ground line 57 is connected to the cable side ground line 157. The vehicle side connection line 58 is connected to the cable side connection line 158. The vehicle side communication line 60 is connected to the cable side communication line 160. The cable side temperature sensing line 162 is connected to the power supply side temperature sensing line 262 that is connected to the temperature sensor 256. The temperature sensor 256 is attached to the power supply side connector 254.

The power supply circuit 132 is connected to the cable side power line 151. The power supply connector 154b of the charging cable device 120 and the power supply side connector 254 of the commercial power supply 220 are connected, and the cable side power line 151 and the power supply side power line 251 of the commercial power supply 220 are connected, the power supply circuit 132 converts AC power supplied from the commercial power supply 220 to DC power of a predetermined voltage and supplies it to the cable ECU 130 and other devices.

The control pilot circuit 134 has an oscillation circuit (not shown). The control pilot circuit 134 changes the duty cycle of the outgoing signal from the oscillation circuit using a control signal from the cable ECU 130, and outputs it to the cable side communication line 160.

The connection switch 158a is connected to the vehicle side ground line 57 at one end. The connection switch 158a is connected to the cable side connection line 158 connected to the vehicle side connection line 58 at the other end via a resistor. The two ends of the connection switch 158a are connected via a resistor. The connection switch 158a is configured as a push-down switch that turns off when pushed down near the vehicle connector 154a.

The cable ECU 130, which is not shown in the figure, is It is configured as a microprocessor with a CPU at its core. In addition to the CPU, the cable ECU 130 is equipped with a processing ROM for storing programs, RAM for temporarily storing data, input/output ports, and communication ports. The cable ECU 130 is connected to the cable side temperature sensing line 162 and inputs the supply connector temperature from the temperature sensor 240 attached to the power supply side connector 254. The cable ECU 130 inputs signals from the leakage current detection circuit (not shown) attached to the cable side power line 151. The cable ECU 130 outputs to the charging relay 152 a drive signal.

The cable ECU 130 communicates with the control pilot circuit 134. The cable ECU 130 sends the chargeable current (for example, current rating, power supply connector temperature, etc.) based on information obtained from the commercial power supply 220 as a control signal as a duty relative to the rated current to the control pilot circuit 134.

The control pilot circuit 134 deity controls the outgoing signal from the oscillation circuit based on the control signal received from the cable ECU 130, and transmits it to the electronic control unit 70 via the cable side communication line 160 and the vehicle side communication line 60. When the connection switch 158a is pushed down and set to off, the cable ECU 130 turns off the charging relay 152 based on a signal from the electronic control unit 70 that detects it.

The electronic control unit 70 is configured as a microprocessor with a CPU 72 as its core. In addition to the CPU 72, the electronic control unit 70 includes a ROM 74, RAM 76, flash memory (not shown), input ports (not shown), output ports (not shown), and communication ports (not shown) and so on.

The electronic control unit 70 inputs signals from various sensors via input ports. Some of the input signals include, for example, the following.

(1) Rotational position θm from a rotational position detection sensor (e.g., resolver) 32a that detects the rotational position of the rotor of motor 32.

(2) Voltage VB from voltage sensor 36a mounted between the terminals of the battery 36.

(3) Current IB from the current sensor 36b attached to the output terminal of the battery 36.

(4) Voltage VH of the high voltage side capacitor 46 (the high voltage side power line 42) from the voltage sensor 46a mounted between the terminals of the high voltage side capacitor 46.

(5) Voltage VL of the low voltage side capacitor 48 (the low voltage side power line 44) from the voltage sensor 48a mounted between the terminals of the low voltage side capacitor 48.

(6) Supply voltage Vin from voltage sensor 51a attached to the charging power line 51.

(7) Charge voltage Vchg from voltage sensor 51b.

(8) Charging current Ichg from current sensor 51b.

(9) Voltage from the voltage sensor detecting the voltage between the terminals of the smoothing capacitor 52b in the power conversion circuit 52.

The input port of the electronic control unit 70 is connected to the vehicle side connection line 58, which is connected to the vehicle side inlet 54, and is connected to the lid signal line 62 from the lid sensor 56, which is attached to the vehicle side inlet 54.

The electronic control unit 70 also functions as a controller for the vehicle's drive. For this purpose, the electronic control unit 70 inputs information for system startup and driving control. This information may include, for example, the following.

(1) Start signal from the start switch 77.

(2) Shift position from the shift position sensor that detects the operating position of the shift lever.

(3) Accel opening from the accelerator pedal position sensor that detects the depressed position of the acceleration pedal.

(4) Brake pedal position from the brake pedal position sensor that detects the position of the brake pedal.

(5) Vehicle speed from speed sensor.

The electronic control unit 70 outputs various control signals via output ports. The signals to be output include the following.

(1) Switching control signal to the transistor of the inverter 34.

(2) Switching control signal to the transistor of the boost converter 40.

(3) Drive control signal to the system main relay 38.

(4) Drive control signal to the power conversion circuit 52.

(5) Display signal to the display 78 located on the instrument panel in front of the driver's seat.

(6) Lighting signal to the ready lamp 79.

(7) Switching control signal to the transistor of the DC/DC converter 82.

The electronic control unit 70 communicates with the control pilot circuit 134 of the charging cable device 120, when the vehicle side communication line 60 connected to the communication port is connected to the cable side communication line 160. The electronic control unit 70 calculates the chargeable current Iin that is available to charge the battery 36 using power supply from the commercial power supply 220, based on a duty controlled outgoing signal from the control pilot circuit 134. The electronic control unit 70 calculates the chargeable power (infrastructure power) Pin based on he chargeable current Iin and the supplied voltage Vin from voltage sensor 51a. The electronic control unit 70 calculates the storage ratio SOC of the battery 36 based on the integrated value of the current Ib of the battery 36 from the current sensor 36b. The storage ratio SOC is the ratio (percentage) of the amount of power that can be discharged from the battery 36 to the total capacity of the battery 36.

Figure 3:
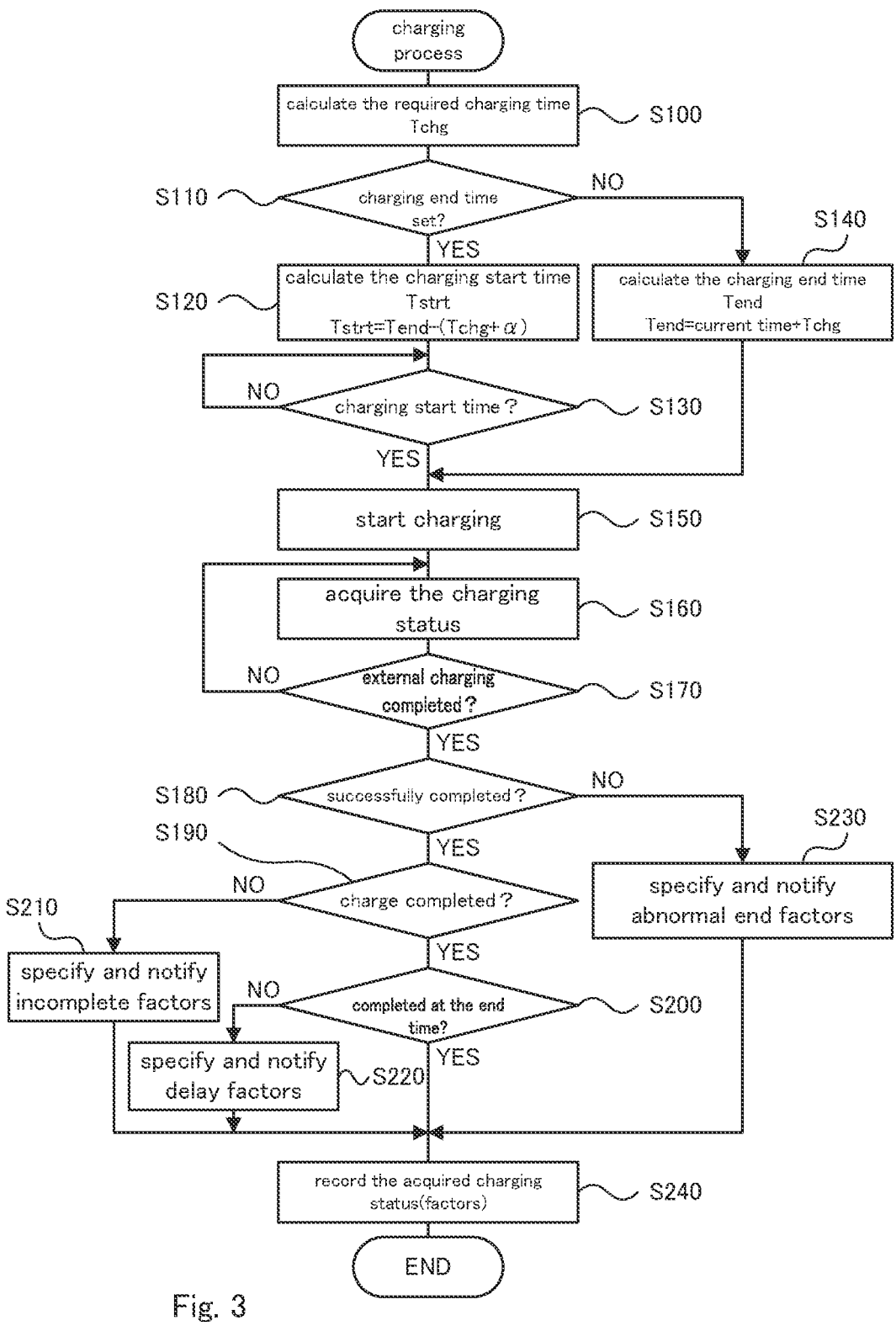
FIG. 3 shows a flowchart of an example charging process executed by the electronic control unit 70.

Next, the operation of the electric vehicle 20 of the embodiment thus configured is described, especially the operation when charging the battery 36 by electric power from the commercial power supply 220. The external charging of the battery 36 is executed when the user instructs reserved charging together with the setting of the charging end time Tend or when the user gives a charging start instruction to start charging immediately in a state in which a commercial power supply 220 is connected to the vehicle side inlet 54 of the electric vehicle 20 by the charging cable device 120. FIG. 3 shows a flowchart of an example charging process executed by the electronic control unit 70. The charging process is performed when the vehicle side inlet 54 of the electric vehicle 20 is connected to the commercial power supply 220 by the charging cable device 120 to perform external charging of the battery 36.

As the charging process is executed, the electronic control unit 70 first calculates the required charging time Tchg (Step S100). The required charging time Tchg can be obtained by dividing the free capacity of battery 36 by the chargeable power (infrastructure power) Pin. The free capacity of battery 36 can be determined by multiplying the total capacity of battery 36 by (100−storage ratio SOC)/100. The chargeable power Pin can be calculated by the multiplication of the supplied voltage Vin from the voltage sensor 51a and the chargeable current Iin based on the duty-controlled outgoing signal from the control pilot circuit 134.

Next, the electronic control unit 70 determines whether the charging end time Tend is set (Step S110). The charging end time Tend is set by the user at the time the reserved charging is indicated by the user. In the case where it is determined that the charging end time Tend has been set, the electronic control unit 70 sets the charging start time Tstrt by subtracting the required charging time Tchg plus the margin time a from the charging end time Tend (Step S120). Then, the electronic control unit 70 waits until the charging start time Tstrt is reached (step S130) and starts charging (step S130). The margin time a can be 10 or 15 minutes, for example. In the case that the electronic control unit 70 determines that the charging end time Tend has not been set, the electronic control unit 70 calculates the charging end time Tend by adding the time required for charging to the current time (step S140), and then starts charging (step S150). External charging of the battery 36 is performed by a charging power set within the range of the rated current and voltage. External charging of the battery 36 can be performed by controlling the power conversion circuit 52 so that the charging power is an appropriate charging voltage Vchg to charge the battery 36, specifically.

Once the electronic control unit 70 starts charging, it executes the process of acquiring the charging status until the external charging end (steps S160, S170). The charging status includes the charging current Ichg, the charging voltage Vchg, and the temperature Tb of the battery 36.

Once the external charging ends, the electronic control unit 70 determines whether the external charging has been successfully completed (step S180). External charging is terminated when the battery 36 is fully charged, or by the user's instruction (switch operation) to terminate charging in the middle of charging, or by the occurrence of an abnormality. Of these, all terminations are determined to be normal except for terminations due to abnormalities. In case the electronic control unit 70 determines that the external charging has been successfully completed, it determines whether the end of charging is due to the completion of charging and whether the end of charging is at the end time Tend (steps S190, S200). In case the electronic control unit 70 determines that the charging end is due to the completion of charging and that the end is at the charging end time Tend, it records the acquired charging status (step S240) and terminates the process.

In case the electronic control unit 70 determines in step S190 that the charging end is not due to completion of charging (i.e., the end is due to the user's instruction (switch operation) to end charging in the middle of charging), it identifies the factors that prevented completion of charging (incomplete factors) from the acquired charging status and notifies the user of such factors (step S210). The electronic control unit 70 then records the obtained charging end status, including the identified incomplete factors (step S240), and ends this process. In this case, the incomplete factors include a charging end instruction (switch operation) by the user and also the temperature drop of the battery 36 or the voltage drop on the commercial power supply 220 side, which caused the charging to be incomplete. The notification may be by display on the display 78 or by voice. The notification can be made, for example, by announcing that "charging could not be completed due to low battery temperature," "charging could not be completed due to low voltage on the external power supply side," or "charging could not be completed due to the user's instruction to end charging," etc. In case the electronic control unit 70 determines in step S200 that charging end is not at the charging end time Tend, it identifies the factors (delay factors) that prevented charging from ending at the charging end time Tend from the acquired charging status, and informs the user of such factors (step S220). The electronic control unit 70 then records the acquired charging status, including the identified delay factors (step S240), and ends this process. The delay factors include the temperature drop of the battery 36 and the voltage drop on the 220 side of the commercial power supply, which delayed the completion of the charge. The notification may be by display on the display 78 or by voice. The notification can be made, for example, by announcing that "it took time to complete charging due to low battery temperature" or "it took time to complete charging due to low voltage on the external power supply side".

In case the electronic control unit 70 determines in step S180 that the external charging end has not been completed normally (i.e., it is an abnormal end), it identifies the cause of the abnormal end from the acquired charging status and other information and informs the user of the cause (step S230). The electronic control unit 70 then records the acquired charging status, including the cause of the abnormal end (step S240), and ends this process. The notification may be by display on the display 78 or by voice. The notification may be made, for example, by announcing that "Charging end due to an abnormality. Please consult a dealer or repair store."

In the electric vehicle 20 of the embodiment described above, in case the electronic control unit 70 determines that the charging end of battery 36 has not been completed or that the charging end of battery 36 is beyond the charging end time Tend, even when the external charging has been completed successfully, the electronic control unit 70 will identify the factors (incomplete factors or delay factors) and inform the factors. This prevents the user from feeling uncomfortable in case charging is not completed at the charging end time Tend or in case charging is completed beyond the charging end time Tend. Furthermore, the electronic control unit 70 records the charging status, including the identified factors (incomplete factors, delay factors, and factors for abnormal ends). This allows us to obtain the charging end status and factors (incomplete factors, delay factors, and factors for abnormal ends) recorded by dealers and repair stores and to handle these situations.

In the electric vehicle 20 of the embodiment, external charging is performed by connecting the commercial power supply 220 to the vehicle side inlet 54 of the electric vehicle 20 using the charging cable device 120. However, external charging may be performed by connecting the external power supply side connector to the vehicle side inlet 54 of the electric vehicle 20, without using the charging cable device 120.

In the electric vehicle 20 of the embodiment, the commercial power supply 220 that provides AC power is used as the external power supply. However, a DC power supply that provides DC power may be used as an external power supply. In this case, the charger 50 should be equipped with a circuit that converts power from an external power supply to power of the desired voltage instead of the power conversion circuit 52.

In the electric vehicle 20 of the embodiment, the battery 36 is used as the power storage device. However, any power storage device can be used, such as a capacitor. In the electric vehicle 20 of the embodiment, the boost converter 40 is provided. However, it may not be equipped with the boost converter 40.

The embodiment is in the form of the electric vehicle equipped with the motor 32. However, it can also be in the form of a hybrid vehicle with an engine in addition to the motor 32, or a vehicle with a fuel cell.

In the electric vehicle of the present disclosure, the controller may be programmed to obtain a factor including at least one of a temperature drop of the power storage device or a voltage drop on the external power supply side as the incomplete factor or the delay factor. This is based on the fact that the time required to complete charging of the power storage device increases when the temperature of the power storage device drops or the voltage drops occur on the external power supply side.

In the electric vehicle of the present disclosure, the controller may be programmed to store the incomplete factor or the delay factor. In this way, it is possible to read out the incomplete and the delay factors and deal with the situation where charging is not completed at the scheduled charging end time or where charging is completed beyond the scheduled charging end time.

The following is an explanation of the correspondence between the main elements of the embodiment and the main elements of the disclosure described in the section on means to solve the problem. In the embodiment, the battery 36 corresponds to a "power storage device," the charger 50 correspond to a "charger," and the electronic control unit 70 corresponds to a "controller".

The correspondence between the major elements of the embodiment and the major elements of the disclosure described in the means to solve a problem section is an example of how the embodiment can be used to specifically explain the embodiment of the disclosure described in the means to solve a problem section. This does not limit the elements of the disclosure described in the means to solve the problem section. In other words, interpretation of the disclosure described in the means to solve a problem section should be based on the description in that section, and the embodiment is only one specific example of the disclosure described in the means to solve a problem section.

The above is a description of the form for implementing this disclosure using the embodiment. However, the present disclosure is not limited in any way to these embodiments, and can of course be implemented in various forms within the scope that does not depart from the gist of the present disclosure.

INDUSTRIAL APPLICABILITY

This disclosure is applicable to the electric vehicle manufacturing industry and other applications.

The invention claimed is:

1. An electric vehicle comprising:

a power storage device;

a charger configured to charge the power storage device with power from an external power supply; and a controller programmed to control the charger;

wherein the controller is programmed to calculate a required charging time for charging before charging the power storage device by the charger, and calculate a scheduled charging end time using the required charging time;

obtain an incomplete factor for which the charging was not completed, in case the charging of the power storage device is not completed at the scheduled charging end time; and obtain a delay factor that delayed completion of charging, in case the charging of the power storage device is completed beyond the scheduled charging end time.

2. The electric vehicle according to claim 1, wherein the controller is programmed to obtain a factor including at least one of a temperature drop of the power storage device or a voltage drop of the external power supply as the incomplete factor or the delay factor.

3. The electric vehicle according to claim 1, wherein the controller is programmed to store the incomplete factor or the delay factor.

\* \* \* \* \*